US012358126B2

(12) United States Patent
Asada et al.

(10) Patent No.: US 12,358,126 B2
(45) Date of Patent: Jul. 15, 2025

(54) APPARATUS AND METHOD FOR CONTROL OF HEAVY OBJECT TUMBLING

(71) Applicant: Massachusetts Institute of Technology, Cambridge, MA (US)

(72) Inventors: Haruhiko Harry Asada, Lincoln, MA (US); Cormac O'Neill, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 218 days.

(21) Appl. No.: 18/266,791

(22) PCT Filed: Jan. 19, 2022

(86) PCT No.: PCT/US2022/012893
§ 371 (c)(1),
(2) Date: Jun. 12, 2023

(87) PCT Pub. No.: WO2022/159435
PCT Pub. Date: Jul. 28, 2022

(65) Prior Publication Data
US 2024/0051115 A1    Feb. 15, 2024

Related U.S. Application Data

(60) Provisional application No. 63/139,067, filed on Jan. 19, 2021.

(51) Int. Cl.
*B25J 9/10* (2006.01)
*B25J 9/00* (2006.01)

(52) U.S. Cl.
CPC ........... *B25J 9/0078* (2013.01); *B25J 9/1045* (2013.01)

(58) Field of Classification Search
CPC ............................. B25J 9/0078; B25J 9/1045
See application file for complete search history.

(56) References Cited

U.S. PATENT DOCUMENTS 2,164,126 A    6/1939   Medenwald
4,883,184 A    11/1989  Albus
(Continued)

FOREIGN PATENT DOCUMENTS

WO    WO-2016126173 A1 *   8/2016

OTHER PUBLICATIONS

Gosselin,Clément. "Cable-driven parallel mechanisms: state of the art and perspectives." Mechanical Engineering Reviews 1.1 (2014): DSM0004-DSM0004. (Year: 2014).*
(Continued)

*Primary Examiner* — Dale Moyer
(74) *Attorney, Agent, or Firm* — Wolf, Greenfield & Sacks, P.C.

(57) ABSTRACT

Autonomous systems for control of heavy object tumbling and related methods are generally described. In some embodiments, the autonomous system may include one or more tethers connected to a heavy object, each tether position and location controlled by one or more actuators. The control system may include one or more processors in communication with the actuators to maintain constant quasi-static control of the heavy object during a tumbling process, in which the object is manipulated (e.g., rotated about an axis relative to a supporting surface) to provide access to alternate faces of the object. In some embodiments, the control system may reduce the risk of uncontrollable tumbling by alternating between position and tension control of the tethers depending on the orientation of the object and/or progression of the tumbling process.

20 Claims, 6 Drawing Sheets

(56) References Cited

U.S. PATENT DOCUMENTS 6,826,452 B1 11/2004 Holland et al.
2012/0043162 A1* 2/2012 Kim ................... B25J 9/0078
182/142

OTHER PUBLICATIONS

Begey, Jeremy, et al. "Dynamic control of parallel robots driven by flexible cables and actuated by position-controlled winches." IEEE Transactions on Robotics 35.1 (2018): 286-293. (Year: 2018).*
International Search Report and Written Opinion mailed Mar. 29, 2022, for Application No. PCT/US2022/012893.
International Preliminary Report on Patentability mailed Aug. 3, 2023, for Application No. PCT/US2022/012893.
Bostelman et al., Applications of the Nist Robocrane. Robotics Manufacturing. 1994; 5: 403-10.
Chavan-Dafle et al., Regrasping by fixtureless fixturing. CoRR. arXiv. Massachusetts Institute of Technology. 2018; 8 pages.
Chavan-Dafle et al., Prehensile pushing: in-hand manipulation with push-primitives. IEEE/RSJ Int Conf Intel Robots Sys (IROS). 2015; 8 pages.
Dafle, Extrinsic dexterity: In-hand manipulation with external forces. Int Conf Robotics Automation (ICRA). 2014; 1578-85.
Fazeli et al., Parameter and contact force estimation of planar rigid-bodies undergoing frictional contact. Int J Robotics Res. 2017; 36(13-14): 1437-54.
Hoffman et al., Precision assembly of heavy objects suspended with multiple cables from a crane. IEEE Robotics Automation Lett. 2020; 5(4): 6876-83.
Lynch et al., Toppling manipulation. IEEE Int Conf Robot Auto. 1999; 7 pages.
Martin et al., Design of a cable-driven parallel robot with grasping device. Procedia CIRP. 2018; 70: 290-5.
O'Neill et al., Safe tumbling of heavy objects using a two-cable crane. IEEE Robot Auto Lett. Apr. 2021; 6(2): 1082-9.
Roberts et al., On the inverse kinematics, statics, and fault tolerance of cable-suspended robots. J Robotic Systems. 1998; 15(10): 581-97.
Sanalitro et al., Full-pose manipulation control of a cable-suspended load with multiple UAVs under uncertainties. IEEE Robotics Automat Lett. 2020; 5(2): 2185-91.
Shahmiri et al., A survey of cable-suspended parallel robots and their applications in architecture and construction. SIGraDi. Congress Iberoamerican Soc Digital Graphics. Nov. 9-11, 2016; 3(1): 7 pages.
Tang, An overview of the development for cable-driven parallel manipulator. Adv Mech Eng. Feb. 2014; 2014: 823028. 9 pages.
Torpey, Got skills? Think manufacturing: Career Outlook: U.S. Bureau of Labor Statistics. Jun. 2014. Retrieved Mar. 12, 2025 from: <https://www.bls.gov/careeroutlook/2014/article/manufacturing.htm>. 11 pages.
Wang et al., AprilTag 2: efficient and robust fiducial detection. IEEE/RSJ Int Conf Intel Robots Sys (IROS). Oct. 2016; 4193-8.

* cited by examiner

APPARATUS AND METHOD FOR CONTROL OF HEAVY OBJECT TUMBLING

CROSS-REFERENCE TO RELATED APPLICATIONS

This application is a national stage filing under 35 U.S.C. § 371 of international application serial number PCT/US2022/012893, filed Jan. 19, 2022, which claims the benefit under 35 U.S.C. § 119 (e) of U.S. provisional application Ser. No. 63/139,067 filed Jan. 19, 2021, the disclosure of each of which is incorporated by reference in its entirety.

FIELD

Disclosed embodiments are related to devices and methods for tumbling heavy objects. More specifically, methods and apparatuses including embodiments related to control systems for cable-suspended parallel robots are disclosed.

BACKGROUND

In industrial settings, manipulation of heavy objects, such as engine cylinder objects and large gearboxes, are typically accomplished manually with the aid of overhead cranes. In some cases, the overhead cranes are used to tumble the heavy objects to gain access to various obstructed portions of the objects for assembly and maintenance.

SUMMARY

In some aspects, systems are provided. In some embodiments, a system for tumbling an object includes two or more tethers configured to be operatively coupled to the object, two or more actuators configured to control a position and tension of the two or more tethers, and one or more processors in communication with the two or more actuators. In some embodiments, the one or more processors are configured to control the two or more actuators to rotate the object around a pivot axis located at a contact between the object and a supporting surface, and wherein the one or more processors are configured to control the two or more actuators to maintain the object in contact with the supporting surface and prevent slip between the object and the supporting surface during rotation of the object.

In some aspects, methods are provided. In some embodiments, a method for tumbling an object includes controlling a tension and/or position of two or more tethers operatively coupled to the object to rotate the object around a pivot axis located at a contact point between the object and a supporting surface, maintaining the object in contact with the supporting surface during rotation about the pivot axis, and preventing slip between the object and the supporting surface during rotation of the object.

In some aspects, methods are provided. In some embodiments, at least one non-transitory computer-readable medium having instructions thereon that, when executed by at least one processor, perform a method for tumbling an object, the method including controlling a tension and/or position of two or more tethers operatively coupled to the object to rotate the object around a pivot axis located at a contact point between the object and a supporting surface, maintaining the object in contact with the supporting surface during rotation about the pivot axis, and preventing slip between the object and the supporting surface during rotation of the object.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

In industrial settings, large and heavy objects, such as engine cylinders and large gearboxes are tumbled to access features on their bottoms and sides for assembly and maintenance. Traditional manual operations, including tumbling, are typically conducted using overhead cranes, and are high-risk and difficult for less experienced workers. Tumbling is a particularly dangerous task for workers since the heavy object goes through an unstable equilibrium in the middle of the operation. Furthermore, the heavy object may slip on the surface, if it is pulled improperly, and if the object loses contact with the surface and goes into the air, it can swing dangerously.

The Inventors have recognized that the dangers and risks associated with manual crane operation can discourage new workers from entering the field, and present challenges for the manufacturing industries to recruit new workers. While increased automation is a potential solution to this growing problem, current heavy industry manufacturing techniques require both fine manipulation and high payload capacities.

Applying traditional industrial robots to heavy industries has been limited to high-volume productions of relatively small, lightweight products. Robots for handling heavy payloads are typically bulky, cost prohibitive, and inflexible, limiting their widespread adoption within the field. A potential alternative is the use of tether-suspended parallel robots (CSPRs), automated cranes which can not only transport heavy objects, but also manipulate in multiple degrees of freedom. However, the Inventors have recognized that CSPRs are still limited in dexterity and suffer from under-actuation, attributed to their reliance on gravity to provide tension for their tethers. Although fully actuated tether robots, which utilize additional tethers, can be employed to overcome this problem, the need to reduce interference between the tethers and the environment provide an incentive to keep the number of tethers low.

The Inventors have further recognized that the presence of kinematic and static singularities, which are shown to occur when a crane loses control over the object being tumbled, further complicates tumbling procedures. During tumbling, one or more tethers are connected to an object, applying a tether force to generate a moment about a pivotal point in order to balance the moment produced by gravity. However, if the force is applied through only a single tether to the tumbling object, there are two cases in which quasi-static balance control cannot be achieved.

Figure 1A:
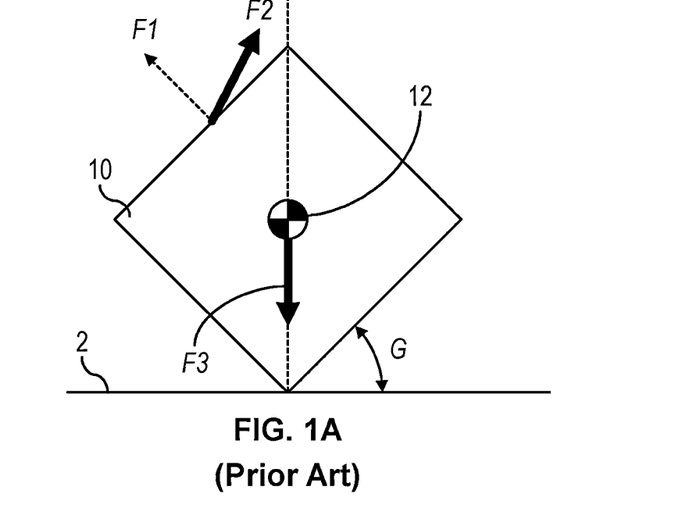
FIGS. 1A-1B show schematic views of prior art tumbling systems.

In the first case, as shown in FIG. 1A, the unstable equilibrium occurs when a tumbling angle G (which may also serve as an angular position) of a simplified object 10, which may be connected to a tether for manipulation, is 45° relative to a supporting surface 2. At this configuration, the object's weight F3 does not produce a moment that counteracts the moment from the tether F2. Therefore, the single tether, which may be connected to the object 10 by an actuator (e.g., winch), cannot control the quasi-static process. As shown in FIG. 1A, the tether cannot generate a clockwise moment due to the unidirectional loading constraint. If the tether pulls the object 10 from the same direction, it creates a counter-clockwise moment, but the object 10 may fall and the tether may not stop it. The object 10 is therefore not controllable at this configuration with a single tether. This particular configuration is referred to as the gravity singularity, or the gravitationally unstable orientation of the object.

Figure 1B:
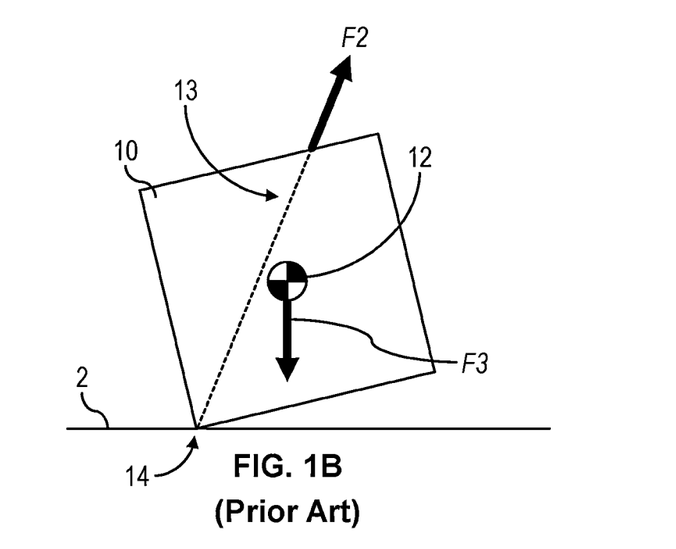

As shown in FIG. 1B, in the second case, the tether's line of action 13 passes through a pivotal point, preventing the tether tension F2 from generating a moment about it. As the object 10 is rotated, the distance between the pivot and the line of tether force 13 varies; and the moment reduces to zero as it approaches this particular point where the tether line and the pivot point 14 align. If the center of mass 12 is still generating a finite moment relative to gravity when this occurs, moment balance may fail, and the system may be unable to maintain quasi-static balance control over the object. This particular configuration is referred to as the tether singularity.

The Inventors have recognized that the presence of gravitational and tether singularities renders tumbling with a single winch dangerous and unsafe. The winch is likely to lose control over the tumbling process as it reaches these singularity configurations, regardless of where the winch is located relative to the object. The object's behavior is generally governed by its frictional interface with the supporting surface and the force generated by the tether. The Inventors have appreciated that subject to unidirectional loading constraints; a tether may go slack when compressed. Thus, at least two tethers may be utilized to overcome the unidirectional loading constraints and coordinated to tumble an object safely.

In view of the above, the Inventors have recognized the benefits associated with an autonomous CSPR system for safely manipulating (e.g., tumbling) a heavy object with a multi-tether crane by exploiting environmental contacts. The system may safely tumble the heavy object about a contact point on a supporting surface, without the object slipping or being lifted into the air, which can be dangerous for nearby workers. In some embodiments, the system may include actuators for controlling tethers connected to the heavy object to controllably manipulate (e.g., tumble) the object. The actuators may in turn be in communication with one or more processors associated with a control system to facilitate the tumbling process in a safe manner, maintaining the object in constant contact with the supporting surface and preventing object slip on the surface. The system may therefore maintain quasi-static control of the object during the entirety of the tumbling process to avoid uncontrolled movements.

In some embodiments, an autonomous system may include one or more processors as part of a control system to maintain quasi-static control of the object. The control system may automatically control tension and position of two or more tethers connected to a heavy object, which may be tumbled or otherwise manipulated about a supporting surface. In some embodiments, the control system may serve to shift the tumbling angles at which either the gravitational or tether singularities occur, such that the autonomous system may maintain consistent control of the object, avoiding loss of control associated with singularities.

The control systems described herein overcome the unidirectional loading limitation of tethers connected to the object by using static friction from contact with a supporting surface and two or more of tethers to maintain positive tether tensions throughout the tumbling process. The multi-tether approach allows for the system to be controllable even at the gravitational singularity, wherein the tumbling angle is 45° (for a rectilinear shaped object). It should be appreciated that such an arrangement, control of a heavy object at gravitation singularity may not be achievable with a single actuator and tether setup, akin to conventional tumbling systems.

In some embodiments, an autonomous system may include two or more actuators (e.g., winches) for controlling tension and position of two or more tethers connected to the heavy object. A control system, including one or more processors, may serve to safely tumble the object and maintain consistent quasi-static control of the object. In some embodiments, the control system may employ a follower-leader arrangement, in which a load is transferred from a leader tether which initially bears the majority of the load as the object is being tumbled (or otherwise manipulated) about a pivot axis, to a follower tether. In some embodiments, the leader tether may be position controlled from the initial resting position of the object until the control system determines a transfer may safety take place. Once the leader and follower roles are swapped, the former follower tether, which may have been tension controlled prior to the transfer, may continue the tumbling process via position control. Accordingly, the new follower tether may be tension controlled, as will be described in greater detail below. This transfer, which may be referred to as a handover process, may occur at an angular position of the object which may be different from the angular position of its gravitational singularity in absence of the control systems described herein. In other words, the control system may shift the orientation at which the handover procedure may occur to improve safe handling.

In some embodiments, the shift in the angular orientation at which the handover procedure occurs may be attributed to a positive or bias tension applied to the leader tether during the tumbling process. As will be described in greater detail below, the bias tension may change the force balance of the object during tumbling, such that the singularity point occurs at a new angular orientation of the object, reducing the risk of uncontrollable tumbling.

As described previously, at the gravitational singularity point, the moment applied by gravity about the center of mass of the object vanishes, which may result in static uncontrollability using conventional tumbling systems. In other words, the system may lose its ability to quasi-statically control the tumbling angle through static balancing. The Inventors have recognized that although static balance may be achieved through zero tether tensions at the singularity point by allowing the tethers to go slack, the unidirectional nature of load bearing may not allow the tethers to control the tumbling angle, resulting in an uncontrollable object.

Accordingly, the autonomous tumbling systems described herein may include a control system, which may apply a bias tension to the tethers. A typical tumbling process may be symmetric with respect to the gravitational singularity point. Thus, the role of the two tethers may swap at the singularity point. For example, a first tether may bear most of the load for the first half of the process, from the initial resting state of the object (when resting on the supporting surface) to the singularity point, and a second tether may bear the load from the singularity point to the final resting state of the object. In some embodiments, the tether bearing the majority of the load may be referred to as the leader, while the other tether may be referred to as the follower.

In some embodiments, the control systems described herein may apply the bias tension to the follower in order to change the force balance at the singularity point. In other words, although the gravity moment may vanish at the singularity point, the resultant force of gravity and the bias tension may produce a non-zero moment at the singularity point. Accordingly, the zero moment point, or the point at which the majority of load is handed over from the leader to the follower, is shifted. In other words, the bias tension may enable a shift in the angular position of the gravitational singularity relative to a pivot axis. As will be described in greater detail below, the introduction of the bias tension allows the handover process between the leader and the follower to take place after passing the original gravitational singularity point, which may result in greater quasi-static control of the tumbling behavior of the object in the vicinity of the singularity point, and a smoother handover process.

As will be described in greater detail below, it may be desirable to provide one or more of the following conditions during operation. Specifically, one or more processors may be configured to operate the actuators of a system to provide: a) a no-slip condition, in which the object may not significantly slip on the supporting surface, b) a no-lift condition, in which the object may not be lifted into the air (where it may accidentally strike a worker or nearby object), and c) the process may be operated at a speed that may be approximated as a quasi-static process to maintain control over the object. In some embodiments, a control algorithm may be employed to coordinate the actuators to safely tumble the object without slipping or becoming airborne as well as for eliminating the effect of singularities.

It should be appreciated that the term "tether" as used herein may refer to any connective tether capable of being tensioned to manipulate an object. Tether may refer to a flexible or inflexible connection, and may include one or more cables, flexible attachments, straps, cords, ropes, chains, wires, and/or any other suitable connection. It should also be appreciated that although two-tether systems are generally described, the autonomous systems of the present disclosure may employ any number or combination of tethers, actuators (e.g., winches), connections (e.g., hooks), processors, non-transitory computer-readable media, controllers, and/or any other suitable component.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 2:
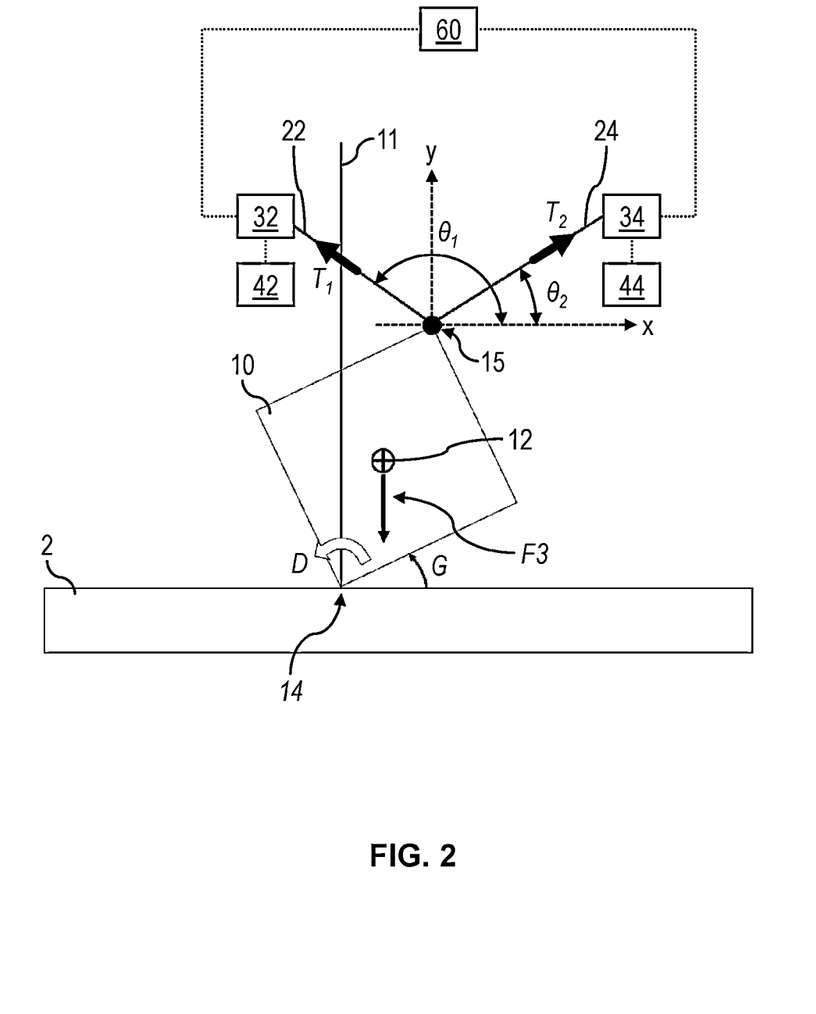
FIG. 2 shows, according to some embodiments, a schematic of an autonomous tumbling system in operation.

FIG. 2 shows, according to some embodiments, an autonomous CSPR system for safe tumbling of an object 10. The object 10 may be pivoted along a direction D, about a pivot axis 11 to a supporting surface 2 on which it rests, at a tumbling angle G. The object 10 may experience a gravitational moment F3 related to its weight and relative to its center of mass 12. The object 10 may be connected to two or more tethers 22, 24 at a hook 15 or any other suitable connection known in the art. It should be appreciated that although the tethers 22, 24 are shown to be connected to the hook 15 at a corner of the object 10, the position and number of the hooks 15 may be optimized to be anywhere along the surface of the object 10. Although FIG. 2 shows both tethers 22, 24 may be connected to the object 10 at the same hook 15, embodiments in which more than one tether is connected at various portions of the object are also contemplated.

Tethers 22, 24 may be controlled by actuators 32, 34. In some embodiments, the actuators may be winches, although alternative embodiments of the actuators are also contemplated. In some embodiments, as shown in FIG. 2, actuators 32, 34 may be in communication with one or more processors 60, which may be associated with non-transitory computer readable memory that includes instructions to perform any of the methods described herein.

In some embodiments, the actuators 32, 34 may include or in communication with one or more sensors 42, 44 for sensing tension along the tethers 22, 24. For example, the actuators 32, 34 may control tension of the tethers (e.g., tension T1 of tether 22 and tension T2 of tether 24) with signals/data collected by one or more sensors 42, 44. Tether tension may be measured using any suitable sensor, including, but not limited to, load cells, current draw sensors, strain gauges, motor torque sensors, current sensors, tensile sensors, combinations thereof, and/or any other suitable sensor.

The actuators 32, 34 may also include or in communication with sensors to sense position of the tethers 22, 24. For example, the actuators 32, 34 may control the position of the tethers via signals/data associated with tether angle $\theta_1$ of tether 22 and $\theta_2$ of tether 24 with signals/data collected by one or more sensors. The tether positions may also be controlled via signals/data associated with any other positional parameter of the tether, such as displacement. In some embodiments, the tethers 22, 24 may be positioned on opposing sides of the pivot axis 11, as shown in FIG. 2. Tether position may be measured using any suitable sensor, such as a motor encoder. Of course, it should be appreciated that alternative means for measuring tether tension and/or position are also contemplated, such as optical tracking of the object with markers, accelerometers, and/or any other suitable sensing system.

It should be appreciated that although the object 10 is shown to be a two-dimensional square-shaped object, the autonomous systems herein are not limited to such structures, and may be readily employed for three-dimensional, non-rectilinear objects.

In a typical tumbling process, the object 10 may be tumbled about axis 11 from angular position or tumbling angle G=0, wherein a first face of the object is resting on the supporting surface 2, to G=90°, wherein a secondary face of the object is resting on the supporting surface 2. In the embodiments depicted, the center of mass 12 is assumed to be centrally located on the object 10, however, the autonomous systems described herein may be employed with objects having non-central centers of mass. The center of mass 12 may therefore apply a moment F3 along the direction of gravity throughout the tumbling process.

To achieve safe tumbling, the object 10 is controlled via the actuators 32, 34 to remain constantly in contact with a point 14 on the supporting surface 2. It should be appreciated that point 14 depicted in FIG. 2 may correspond to a point, edge, or surface, as the present disclosure is not so limited. In other words, the object 10 may be controlled in such a way to reduce the risk of slipping along the supporting surface 2 (e.g., away from point 14) and lifting off of the supporting surface 2, wherein the normal force applied to the point 14 is less than or equal to zero. As noted previously, these conditions may allow safe tumbling procedures and reduce the risk of the object 10 uncontrollably flying in the air and/or interfering with a nearby worker or object.

In some embodiments, the autonomous system may maintain quasi-static control of the object 10 throughout the tumbling process. In other words, the object may be tumbled with zero acceleration (e.g., acceleration of angular position or tumbling angle G may be approximately or equal to zero throughout the process), such that it may be readily stopped, and safely returned to the supporting surface. Quasi-static control of the object may also allow the tumbling process to end in a safe manner, to reduce the risk of damage (either to the object itself or nearby environment) when the object is returned to the supporting surface.

In some embodiments, as depicted in FIG. 2, the autonomous system may employ two tethers 22, 24 to tumble the object 10. Each tether may apply a tensile force (e.g., tension T1 by tether 22 and tension T2 by tether 24) to the object 10, controlled by actuators 32, 34. The resultant force F generated by the two tethers 22, 24 may be evaluated by the x-component (see FIG. 2 for x-axis) and y-component of the applied force as follows: $F = \sqrt{F_x^2 + F_y^2}$, wherein $F_x = T_1 \cos\theta_1 + T_2 \cos\theta_2$ and $F_y = T_1 \sin\theta_1 + T_2 \sin\theta_2$, with both tension T1 and T2 greater than or equal to zero.

As discussed previously, the no-lift condition, in which the normal force N of the supporting surface relative to the object is maintained greater than zero may be given by the following relationship: $N = Mg - F\sin\theta > 0$, wherein Mg is the weight of the object and F is the tether force applied to the object. The no-slip condition, in which the object is maintained generally within a suitable friction cone relative to the supporting surface is given by the following relationship $$\phi = \arctan\left(-\frac{F\cos\theta}{N}\right),$$

wherein $\phi$ is the direction of the supporting surface reaction force F. Therefore, in order to maintain the no-lift and no-slip conditions, it is desirable that angle $\phi$ is close to 0 and normal force N is close to the object's weight, Mg.

In some embodiments, the control systems described herein may determine the optimal tether force to satisfy the no-lift and no-slip conditions with a penalty function J as follows:

$$J = \left(\frac{\phi}{\arctan(\mu)}\right)^2 + \left(\frac{Mg - N}{Mg}\right)^2,$$

where $\mu$ is the static friction coefficient between the object and the supporting surface. The penalty is minimized when the reaction force from the floor has no friction, that is, $\phi = 0$, and the normal force is the same as the gravity force of the object.

In some embodiments, the optimal tether force F and its direction $\phi$ may vary depending on the tumbling angle G. For example, at tumbling angles close to 90°, there may be a preference for larger forces due to the greater moment applied by the object's center of mass (see center of mass 12 in FIG. 2) when it is situated further from the friction point 14, requiring a larger tether force F in order to be balanced. In order to avoid slipping, the larger tether force F is therefore preferentially directed vertically, resulting in tether force F being directed in angles $\phi$ close to 90°. However, as the object approaches the tumbling angle G=45°, a smaller tether force F may be capable of providing the required torque to the object to avoid slip. The smaller tether force may be applied at an angle closer to the horizontal without risking the no slip condition. In turn, this increases the normal force N at the friction point 14, which may reduce the risk of the no lift condition being violated. This general trade off results in the no slip condition being dominant closer to tumbling angles G=0 and 90°, while the no lift condition is dominant about G=45°.

As discussed previously, at the gravitational singularity point (e.g., at tumbling angle G=45°), the moment applied by gravity about the center of mass 12 (see FIG. 2) vanishes, which may result in static uncontrollability using conventional tumbling systems. In other words, the system may lose its ability to quasi-statically control the tumbling angle G through static balancing. The Inventors have recognized that although static balance may be achieved through zero tether tensions at the singularity point (tumbling angle G=45°) by allowing the tethers to go slack, the unidirectional nature of load bearing may not allow the tethers to control the tumbling angle G, resulting in an uncontrollable object.

Figure 3:
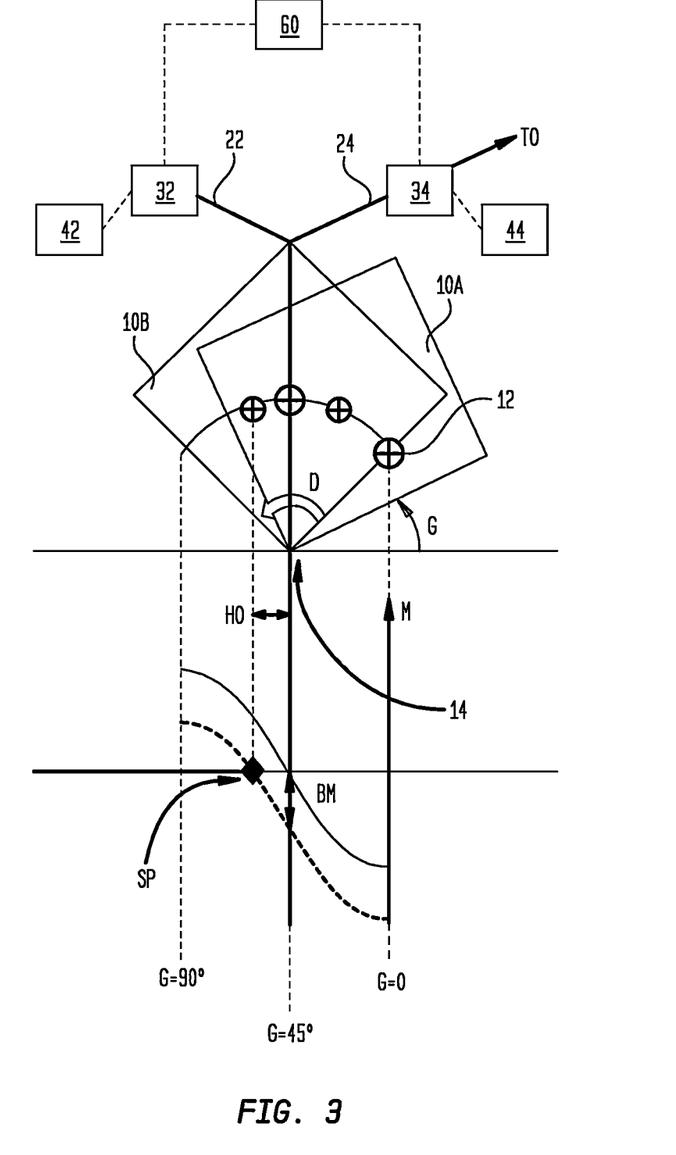
FIG. 3 shows, according to some embodiments, a schematic of a handover procedure with an autonomous tumbling system.
Figure 4A:
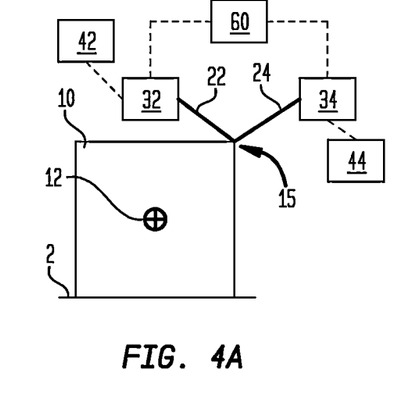
FIGS. 4A-4E show, according to some embodiments, a tumbling process with an autonomous tumbling system.
Figure 4B:
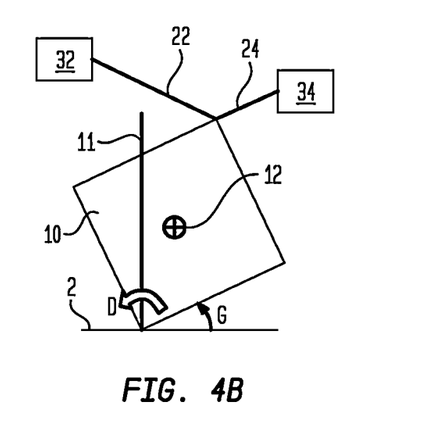
Figure 4C:
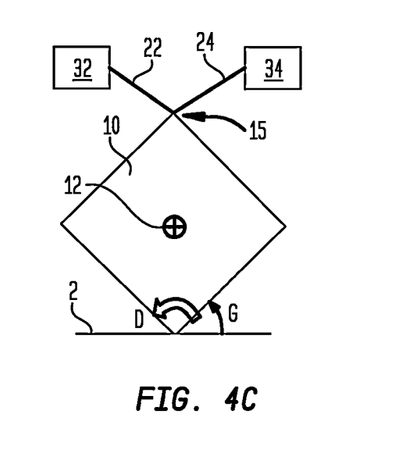
Figure 4D:
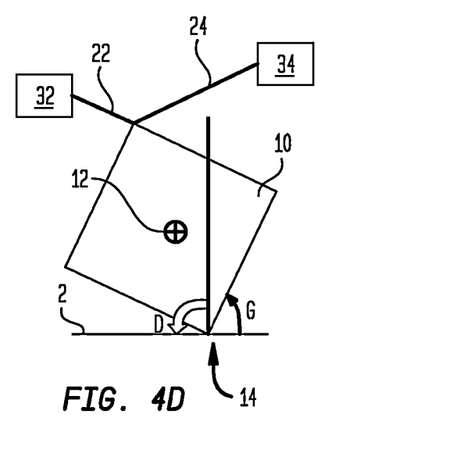
Figure 4E:
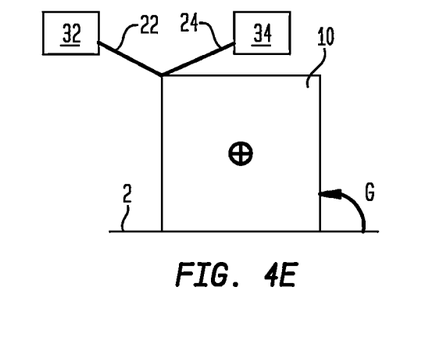

FIG. 3 shows an object moving between two configurations 10A and 10B along a direction D, with its moment M about a friction point 14 plotted as a function of its tumbling angle G. In the autonomous tumbling systems described herein, a control system may be configured to apply a positive or bias tension T0 to a follower tether 24 (relative to a leader tether 22, which may bear the majority of the object load in a first portion of the tumbling process) in order to change the force balance at the singularity point. In other words, although the gravity moment may vanish at the singularity point of tumbling angle G=45°, the resultant force of gravity and the bias tension T0 may produce a non-zero moment at the singularity point. Accordingly, the zero moment point, or the point at which the majority of load is handed over from the leader to the follower, may be shifted.

As shown in FIG. 3, the zero moment point may be shifted along the tumbling angle G to a shifted singular point SP. As the object 10 is tumbled along direction D towards the shifted singular point SP, during a first portion of the tumbling process, the process is statically controllable. As tumbling angle G gets closer to the shifted point SP, gravity force associated with the center of mass 12 may result in a significant counter-clockwise moment (see bias moment BM in FIG. 3, measured along a moment axis M) about the friction point 14, allowing the leader tether (previously tether 22) to hand over the majority of the load to the follower tether (tether 24), as indicated by the handover HO region of FIG. 3, for the remaining portion of the tumbling process.

It should be appreciated that without the bias tension T0, the handover would occur abruptly at tumbling angle G=45°, when the follower tether 22 may not be able to sufficiently statically control the object 10. Thus, with the positive or bias tension T0, the handover may take place after passing the original singular point, at a tumbling angle 45°<G<90°, and a significant gravity moment may build up before tether 22 takes over the leader role. Thus, the actuators 32, 34 of the system may change the roles of tethers 22, 24 (follower to leader and leader to follower, respectively) without losing the static controllability over the tumbling process, resulting in enhanced quasi-static control of the tumbling behavior of the object in the vicinity of the singularity point, and a smoother handover process.

FIGS. 4A-4E depict an object 10 being tumbled about a friction point 14 on a supporting surface 2. The object 10 may be tumbled about an axis 11 along a direction D. In some embodiments, the object's tumbling process, which may be characterized with a tumbling angle G, may be controlled with one or more actuators 32, 34, which serve to control the position and tension of one or more tethers connected to the object at a hook 15 (and/or any other suitable connection) with one or more processors 60.

In a typical tumbling process, a handover procedure (as described previously) may be employed in a simple, practical manner to ensure the enforcement of the no-slip, no-lift, and static controllability conditions defined previously for safe tumbling. Thus, in every phase of the process, as shown in FIGS. 4A-4E, at least one of the tethers 22, 24 is the leader tether and the other is the follower tether. The control systems described herein may employ one or more position sensors 42, 44 to control the leader tether (e.g., in a first portion of the tumbling process, tether 24 in FIGS. 4B-4C, and in a second portion of the tumbling process, tether 22 in FIGS. 4D) and one or more force sensors 42, 44 to maintain a positive tension on the follower tether (e.g., tether 24 in FIGS. 4B-4C, tether 24 in FIG. 4D) and ensure the static controllability throughout the process. As noted previously, any suitable position sensor, including, but not limited to, a motor encoder, and/or any suitable tension/force sensors, including, but not limited to, load cells, current draw sensors, strain gauges, motor torque sensors, current sensors, tensile sensors, combinations thereof, and/or any other suitable sensor may be employed. It should be appreciated that any suitable type and number of sensors associated with each actuator/tether may be employed, as the present disclosure is not so limited. The handover procedure between the two tethers, when load is transferred from the leader to the follower, may be executed within the handover region (see region HO in FIG. 3) where the static controllability is enhanced with use of bias tension T0.

The Inventors have recognized that the use of two tethers for planar tumbling provides the benefit of mitigating the vulnerability of a single-tether system to external disturbances. Due to the unidirectional loading capacity of tether members, disturbances that may result in a compression force being applied to a single tether may not be controlled using the force controller feedback. However, a preloaded second tether, as described herein, oriented such that it is placed into tension when the initial tether would be compressed may provide a way to resist such disturbances and maintain feedback control. This advantage may be exploited in the handover procedure by pre-tensioning the follower tether such that it maintains a constant tension.

Furthermore, the Inventors have recognized that combining position control and force control for the leader and follower tethers via one or more actuators may provide a practical advantage for system integrity over pure force control for both tethers. The position-controlled leader actuator (e.g., actuator 32 in FIG. 4B) may control the progress of tumbling process by geometrically determining the configuration of the object (e.g., with signals generated by one or more position sensors), while the follower actuator (e.g., actuator 34 in FIG. 4B) with force control assures the tension. It should be appreciated that although the resultant force acting on the object may be different from its optimal magnitude and direction, as long as the actuators are positioned properly relative to the object to reach the theoretical optimal conditions, the resultant force acts within the region of no-slip and no-lifting conditions.

Accordingly, it should be appreciated that the leader-follower control scheme described herein includes a number of hyperparameters, including the positioning of the two actuators relative to the object, which defined the angle that the tethers form with the horizontal during tumbling, as well as the bias tension applied to the follower tether may be helpful for providing a safety margin that ensures that satisfaction of the no lift and no slip requirements.

Figure 5:
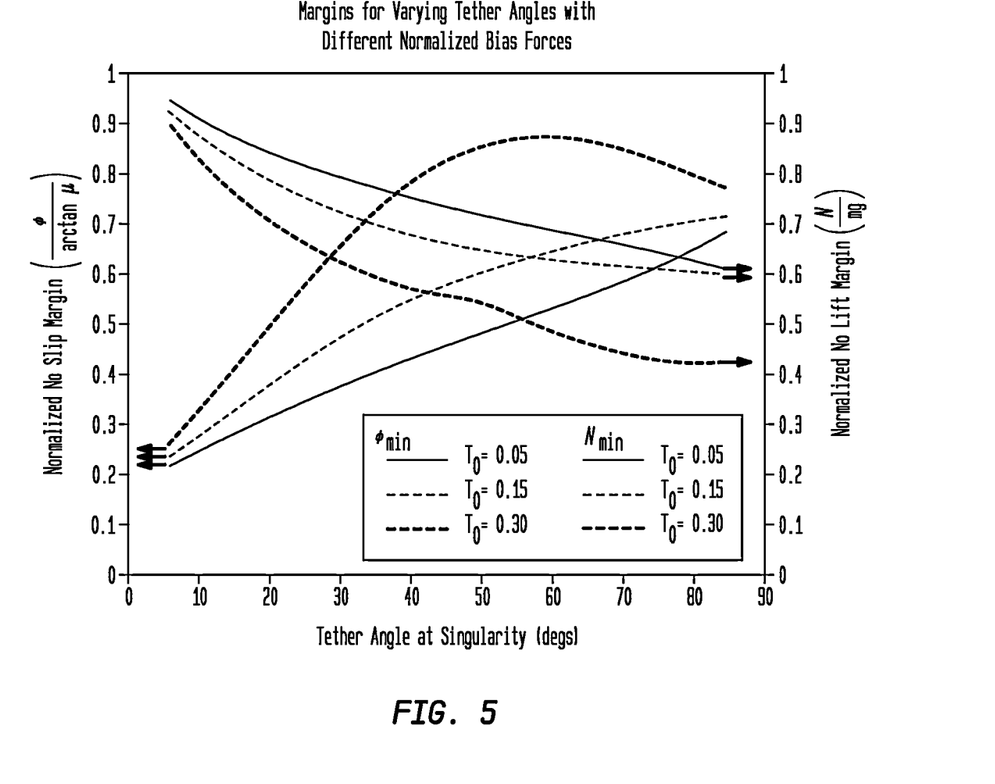
FIG. 5 shows, according to some embodiments, a plot of safety margins as a function of tumbling system configuration.

FIG. 5 shows a plot of the lowest no lift and no slip margins during a simulated tumbling operation, plotted as a function of actuator positioning and bias tensions T0, as shown in the legend. The x-axis represents actuator positioning through tether angle at singularity (e.g., tumbling angle of 45°). As shown in the figure, actuator positioning and follower tether bias force (as shown in the legend) may cause significant variation in the safety margins. The selection of tether angles presents a trade-off between the no slip and no lift requirements, with tether angles that are closer to the horizontal (0°) generally leading to lower no slip margins, but greater no lift margins. This implies that a particular set of tether angles may present an optimal balance between the two conditions. However, physical constraints on the CSPR setup may prevent certain angles from being feasible. This challenge may be overcome by varying the bias tension within the follower tether, since lower tension forces may lead to a cross-over between the two margin curves with tether angles that are closer to vertical.

As shown in FIG. 5, the behavior of the margin curves changes after the bias tension T0 is increased beyond a certain point. Particularly high bias tensions (such as a normalized bias tension T0 of 0.3) lead to the no slip margin peaking at certain tether angles. This occurs when the contact force passes through the vertical direction within the friction cone of the object. While this may lead to greater margins for the no lift condition, the potential for a significantly greater no slip margin may make such a selection worthwhile.

Figure 6:
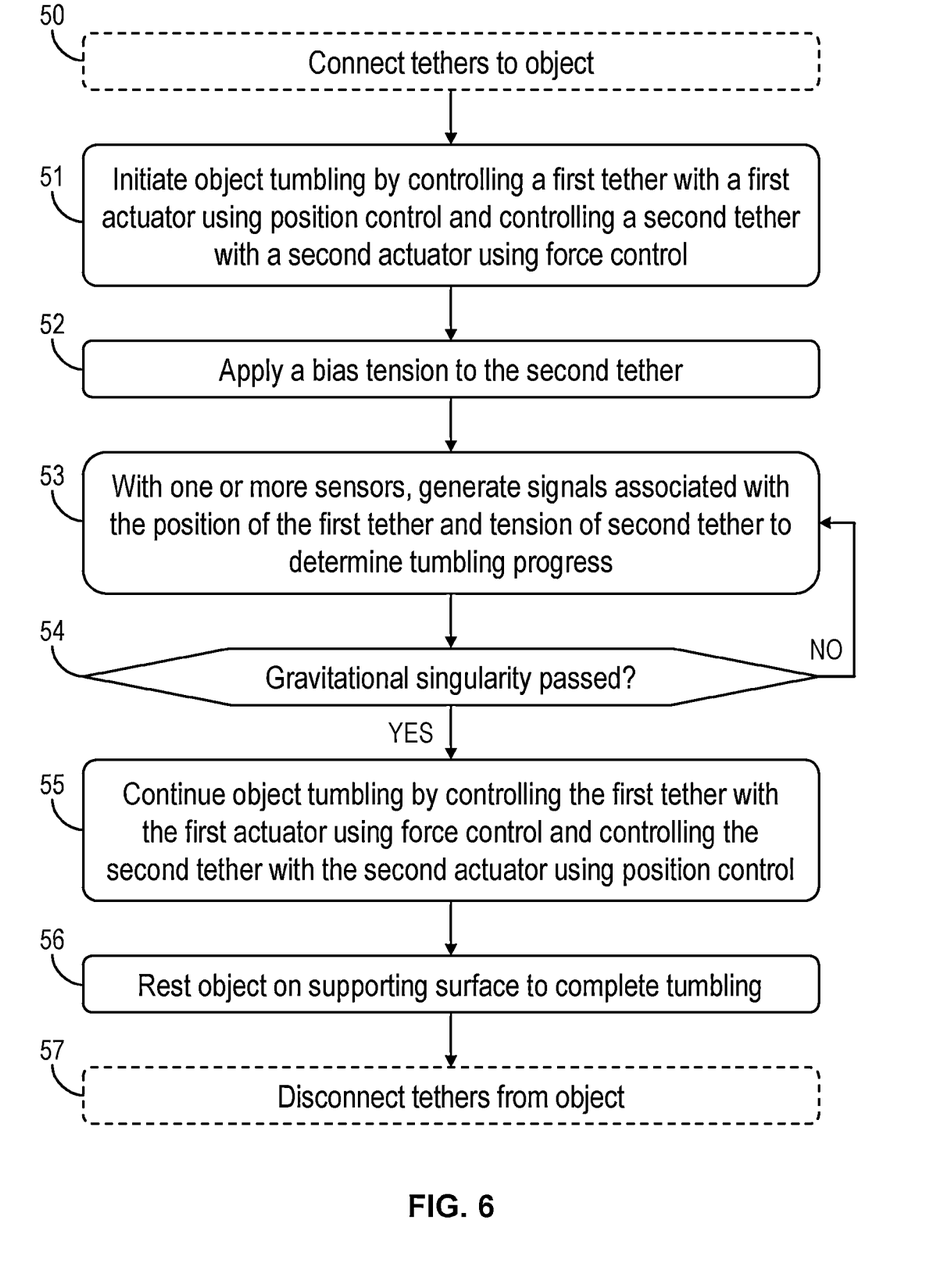
FIG. 6 shows, according to some embodiments, a flow chart for operating an autonomous tumbling system.

FIG. 6 shows, according to some embodiments, a flow chart for operation of autonomous tumbling systems described herein. In optional block 50, two or more tethers are connected to an object. As described previously, a tension and position of each tether may be controlled by one or more actuators. Once the object is properly connected to the tethers, object tumbling may be initiated by controlling a first tether with a first actuator using position control and controlling a second tether with a second actuator using force control, as shown in block 51. It should be appreciated that suitable tether length/positions for given tumbling angles may be determined using inverse kinematics of the physical setup, considering the weight of the object, position of the actuators, signals generated by one or more position and tension sensors, and/or any other suitable input parameters. In block 52, a bias tension may be applied to the second tether (i.e., follower tether) to shift the gravitational singularity point for safe tumbling operation. It should be appreciated that the bias tension may be selected prior to implementation of such a control system to fulfill the no slip and no lift conditions throughout the tumbling process, as described previously.

In blocks 53-54, a feedback loop may be employed to determine when the handover procedure may be initiated. The loop may involve signals related to position generated by one or more sensors associated with the first tether and signals related to tether tension generated by one or more sensors associated with the second tether, as shown in block 53. The tumbling progress may be determined using these signals, and may be evaluated as shown in block 54, to verify if the object has passed the shifted gravitational singularity point. If so, the control system may initiate the handover procedure by controlling the first tether with the first actuator using force control and controlling the second tether with the second actuator using position control, as shown in block 55. The tumbling process may continue, as shown in block 56, when the object is rested back on the supporting surface. The control system may determine the rest position using any suitable manner. For example, the one or more sensors associated with the tethers may generate signals associated with the object exhibiting a diminished gravity moment due to its resting position. Of course, any suitable method may be employed to determine the resting position of the object, including employing signals from the one or more sensors (e.g., position and/or tension sensors) and/or manual control of the object. Once the block is determined to have completed the tumbling process, it may optionally be disconnected from the tethers, as shown in block 57.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

What is claimed is:

1. A system for tumbling an object, the system comprising:
    two or more tethers configured to be operatively coupled to the object;
    two or more actuators configured to control a position and tension of the two or more tethers; and
    one or more processors in communication with the two or more actuators, wherein the one or more processors are configured to control the two or more actuators to rotate the object around a pivot axis located at a contact between the object and a supporting surface, and wherein the one or more processors are configured to control the two or more actuators to maintain the object in contact with the supporting surface and prevent slip between the object and the supporting surface during rotation of the object.

2. The system of claim 1, wherein the two or more actuators include a first actuator operatively coupled to a first tether configured to be disposed on a first side of the pivot axis and a second actuator operatively coupled to a second tether configured to be disposed on a second side of the pivot axis, and wherein the one or more processors are configured to operate the first actuator using position control and the second actuator using force control during a first portion of the rotation of the object about the pivot axis.

3. The system of claim 2, wherein the one or more processors are configured to operate the first actuator using force control and the second actuator using position control during a second portion of the rotation of the object about the pivot axis.

4. The system of claim 2, wherein the first portion of the rotation of the object occurs prior to the object being rotated to a gravitationally unstable orientation.

5. The system of claim 3, wherein the second portion of the rotation of the object occurs after the object is rotated to a gravitationally unstable orientation.

6. The system of claim 2, wherein the one or more processors are configured to control the second actuator to maintain a positive tension in the second tether to shift an angular position of a gravitationally unstable orientation of the object about the pivot axis.

7. The system of claim 6, wherein the one or more processors are configured to initiate position control of a first actuator of the two or more actuators at a first angular position of the object greater than a second angular position corresponding to a gravitationally unstable orientation of the object in absence of the positive tension, the first actuator operatively coupled to a first tether, and wherein the one or more processors are configured to initiate force control of a second actuator of the two or more actuators at the first angular position, the second actuator operatively coupled to a second tether.

8. The system of claim 1, further comprising one or more position sensors configured to generate a plurality of signals corresponding to the position of at least one of the two or more tethers, and one or more force sensors configured to generate a plurality of signals corresponding to the tension of at least one of the two or more tethers.

9. A method for tumbling an object, the method comprising:
    controlling a tension and/or position of two or more tethers operatively coupled to the object to rotate the object around a pivot axis located at a contact point between the object and a supporting surface;
    maintaining the object in contact with the supporting surface during rotation about the pivot axis; and
    preventing slip between the object and the supporting surface during rotation of the object.

10. The method of claim 9, further comprising:
    operating a first actuator using position control during a first portion of the rotation of the object about the pivot axis, the first actuator operatively coupled to a first tether configured to be disposed on a first side of the pivot axis; and operating a second actuator using force control during the first portion of the rotation, the second actuator operatively coupled to a second tether configured to be disposed on a second side of the pivot axis.

11. The method of claim 10, further comprising:

operating the first actuator using force control during a second portion of the rotation of the object about the pivot axis; and operating the second actuator using position control during the second portion of the rotation.

12. The method of claim 11, wherein the first portion of the rotation of the object occurs prior to the object being rotated to a gravitationally unstable orientation, and wherein the second portion of the rotation of the object occurs after the object is rotated to the gravitationally unstable orientation.

13. The method of claim 10, further comprising controlling the second actuator to maintain a positive tension in the second tether to shift an angular position of a gravitationally unstable orientation of the object about the pivot axis.

14. The method of claim 13, further comprising:

initiating position control of a first actuator at a first angular position of the object greater than a second angular position corresponding to a gravitationally unstable orientation of the object in absence of the positive tension, the first actuator operatively coupled to a first tether connected to the object; and initiating force control of a second actuator at the first angular position, the second actuator operatively coupled to a second tether connected to the object.

15. At least one non-transitory computer-readable medium having instructions thereon that, when executed by at least one processor, perform a method for tumbling an object, the method comprising:

controlling a tension and/or position of two or more tethers operatively coupled to the object to rotate the object around a pivot axis located at a contact point between the object and a supporting surface;

maintaining the object in contact with the supporting surface during rotation about the pivot axis; and preventing slip between the object and the supporting surface during rotation of the object.

16. The method of claim 15, further comprising:

operating a first actuator using position control during a first portion of the rotation of the object about the pivot axis, the first actuator operatively coupled to a first tether configured to be disposed on a first side of the pivot axis; and operating a second actuator using force control during the first portion of the rotation, the second actuator operatively coupled to a second tether configured to be disposed on a second side of the pivot axis.

17. The method of claim 16, further comprising:

operating the first actuator using force control during a second portion of the rotation of the object about the pivot axis; and operating the second actuator using position control during the second portion of the rotation.

18. The method of claim 17, wherein the first portion of the rotation of the object occurs prior to the object being rotated to a gravitationally unstable orientation, and wherein the second portion of the rotation of the object occurs after the object is rotated to the gravitationally unstable orientation.

19. The method of claim 16, further comprising controlling the second actuator to maintain a positive tension in the second tether to shift an angular position of a gravitationally unstable orientation of the object about the pivot axis.

20. The method of claim 19, further comprising:

initiating position control of a first actuator at a first angular position of the object greater than a second angular position corresponding to a gravitationally unstable orientation of the object in absence of the positive tension, the first actuator operatively coupled to a first tether connected to the object; and initiating force control of a second actuator at the first angular position, the second actuator operatively coupled to a second tether connected to the object.

* * * * *